United States Patent

[11] 3,623,477

[72] Inventor Robert L. Trent
 50 Front St., Marblehead, Mass. 01945
[21] Appl. No. 816,215
[22] Filed Apr. 15, 1969
[45] Patented Nov. 30, 1971

[54] BIOMEDICAL SENSING AND DISPLAY APPARATUS
 16 Claims, 3 Drawing Figs.

[52] U.S. Cl. .................................................. 128/2.1 B,
 128/2.1 E, 128/DIG. 4
[51] Int. Cl. ..................................................... A61b 5/00
[50] Field of Search .......................................... 128/2.06 B,
 2.06 E, 2.06 G, 2.06 R, 2.1 B, 2.1 R, DIG. 4, 404,
 405, 410, 418

[56] References Cited
UNITED STATES PATENTS
2,933,364 4/1960 Campbell ..................... 128/2.1 B
3,279,468 10/1966 Levine .......................... 128/410
3,411,495 11/1968 Casby ........................... 128/2.1

Primary Examiner—William E. Kamm
Attorney—Griffin, Branigan and Kindness

ABSTRACT: This disclosure describes a biomedical sensing and display apparatus wherein signals detected by a biomedical detecting means, such as electroencephalograph probes, are displayed on a suitable display means. In addition, the detected signals are converted from analog form into digital form and stored in a memory. Electrical system means are provided for comparing the stored signal with later detected signals and displaying the results of the comparison on a display means with the differences between the two signals being intensified. Further, electrical means are provided for applying active signals to some of the probes in order to invoke signals at other probes. In addition, an electroencephalograph probe housing wherein a plurality of probes are mounted in a semihemispherical structure is described. The housing houses microelectronic preamplifier means that are connected to the probes and includes a shielding means to prevent extraneous signals from disturbing the signals detected by the probes.

INVENTOR
ROBERT L. TRENT

BY *Griffin, Branigan and Kindness*
ATTORNEYS

BIOMEDICAL SENSING AND DISPLAY APPARATUS

The invention described herein was made by an employee of the United States Government and may be manufactured and used by or for the government for governmental purposes without the payment of any royalties thereon or therefor.

BACKGROUND OF THE INVENTION

Modern biomedical sensing and display apparatus generally comprise an instrument connected to a plurality of patient-attached probes through a manually operated switch. The output from the switch is connected to an amplifier or a plurality of amplifiers, and the outputs from the amplifiers are connected to a recording device, such as a pen recorder. In this manner, the electrical signals detected by the probes are monitored and recorded. The recorder can be a single-pen recorder or a multiple-pen recorder so that either the signals detected by a single probe can be recorded or the signals detected by a plurality of probes can be simultaneously recorded. The record is later interpreted by skilled medical personnel to determine the medical condition of the patient.

Instruments of the foregoing nature are well known for monitoring and recording brain and heart signals. The former is known as an electroencephalograph (EEG) while the later is known as an electrocardiograph (EKG). While prior art instruments for monitoring and recording medical signals have found widespread use, they have certain disadvantages. For example, they merely monitor and record the signals detected by the probes. The recorded signals must later be analyzed by skilled medical personnel. Hence, these prior art systems require skilled operators as well as skilled medical analysts. In addition, they do not provide a means for comparing the signal detected by one probe at one time with signals detected by the same probe at a later time. Moreover, they provide no means for actively electrically stimulating a patient in the areas being probed.

Therefore, it is an object of this invention to provide a new and improved biomedical sensing and display apparatus.

It is also an object of this invention to provide a biomedical sensing and display apparatus including means for comparing signals so that deviations can be detected between two sets of signals present at the same location, either monitored at different times or subject to different physiological inputs which might cause variations in the signal content.

It is another object of this invention to provide a biomedical sensing and display apparatus including means for applying electrical signals to one or more of a plurality of probes so as to evoke a response in other probes of said plurality of probes.

It is still another object of this invention to provide a new and improved biomedical sensing and display apparatus including means for storing one set of biomedical signals and means for comparing the stored signals with a new set of biomedical signals, and including means for displaying deviations between the two sets of signals in an intensified manner.

It will be appreciated by those skilled in the art that among prior art EEG system problems are the limited number of probes that can be attached to a patient and the difficulties encountered in attaching the probes and maintaining uniform contact resistance during the examination. The attachment difficulty becomes increasingly more difficult when it is desired to reattach a set of probes to the same points on a patient's head as they were previously attached in order to obtain comparison signals for comparing an old record with a new record. More specifically, prior art EEG apparatus is generally limited to about 10 probes per hemisphere. These probes must be individually spaced at desired points on a patient's head and attached to the head by a suitable adhesive. This procedure is both time consuming and tedious. In addition the limited number of probes limits the number of cranial points that can be monitored. Further, this probe attachment procedure makes it extremely difficult to obtain records from common probe points at different periods of time for comparison purposes.

The prior art has attempted to solve the EEG probe problem in various ways. Various types of headgear for supporting the probes have been developed. However, none of these approaches have entirely solved the problem. For example, some of them merely support probes at a limited number of points. Others do not provide a suitable shielding means, hence, interferring signals are superimposed on the desired signals, and detected by the probes, resulting in spurious and nonmeaningful waveforms in their recorded patterns.

Therefore, it is yet another object of this invention to provide a new and improved housing for supporting a plurality of electroencephalograph probes.

It is a still further object of this invention to provide a housing adapted to fit over the head of a patient for supporting a plurality of electroencephalograph probes that includes a suitable shielding means for preventing extraneous signals from being detected by the probes.

SUMMARY OF THE INVENTION

In accordance with a principle of this invention, a biomedical sensing and display apparatus is provided. Biomedical signals from a plurality of probes are sequentially displayed on a display means. In addition, the signals are converted from analog-to-digital form and stored in a memory so that later sensed signals can be compared with earlier stored signals. The results of the comparison are displayed, with detailed deviations between the two compared waveforms being intensified, if desired.

In accordance with another principle of this invention, electric means are provided for applying active electric signals to some of the probes so as to evoke signals in other probes. The evoked biomedical signals may be recorded and/or compared with earlier evoked signals in a manner similar to the recording and/or comparison of nonevoked signals.

In accordance with still another principle of this invention, threshold means are provided for setting thresholds for the signals detected by the probes after amplification. If the thresholds are surpassed, a signal is generated which may be used to notify the operator, interrupt the normal operation of the system, and, if desired, display said waveform and store the corresponding digital sampled information in the memory.

In accordance with still a further principle of this invention, a semihemispherical headpiece for supporting a plurality of EEG probes is provided. The headpiece also houses plurality of microelectronic preamplifiers which may be suitably connected to the probes. Moreover, the headpiece includes a shielding means for preventing external signals from affecting the signals detected by the probes and amplified by the microelectronic preamplifiers. Mechanical or electrical switching means may be provided to allow the individual probes to be used either as a detecting probe to sense EEG signals or as an active probe for applying electric signals to a patient so as to evoke EEG signals which would be detected by other probes.

It will be appreciated by those skilled in the art and others that the invention provides a new and improved biomedical apparatus which allows both monitoring of biomedical signals as well as comparing earlier obtained signals with later obtained signals. In this manner, deviations from normal signals can be detected. The invention is useful with various types of biomedical problems. However, its greatest use is with probes mounted so as to detect electrocardiograph signals, electroencephalograph signals and/or signals produced by other electrical transducers monitoring parameters associated with such physiological systems. The invention can be used for displaying and comparing normally occurring biomedical signals or it can be used for displaying and comparing evoked biomedical signals. If desired, the invention can apply an active electric signal to the probes so as to evoke signals in other probes which are then displayed and/or compared. Alternatively, other external stimuli, such as lights, can be used to evoke biomedical signals in the probes as is well known in the prior art.

It will also be appreciated by those skilled in the art and others that the probe housing provided by the invention greatly improves EEG apparatus. Specifically, because the headgear for housing the probes greatly increases the number of probes that can be applied to the head of a patient, any EEG apparatus is able to more accurately fix the location of lesions and tumors. In addition, the inclusion of a shield improves the signal-to-noise ratio of the overall system. Moreover, because the headgear has a predetermined array of probes, the same probe points on a patient's head can be easily reacquired after the housing has been removed. Hence, skilled personnel are not required to reattach probes to specific points on a patient's head when a new EEG record is to be made after a period of time has elapsed since a prior EEG record was made.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
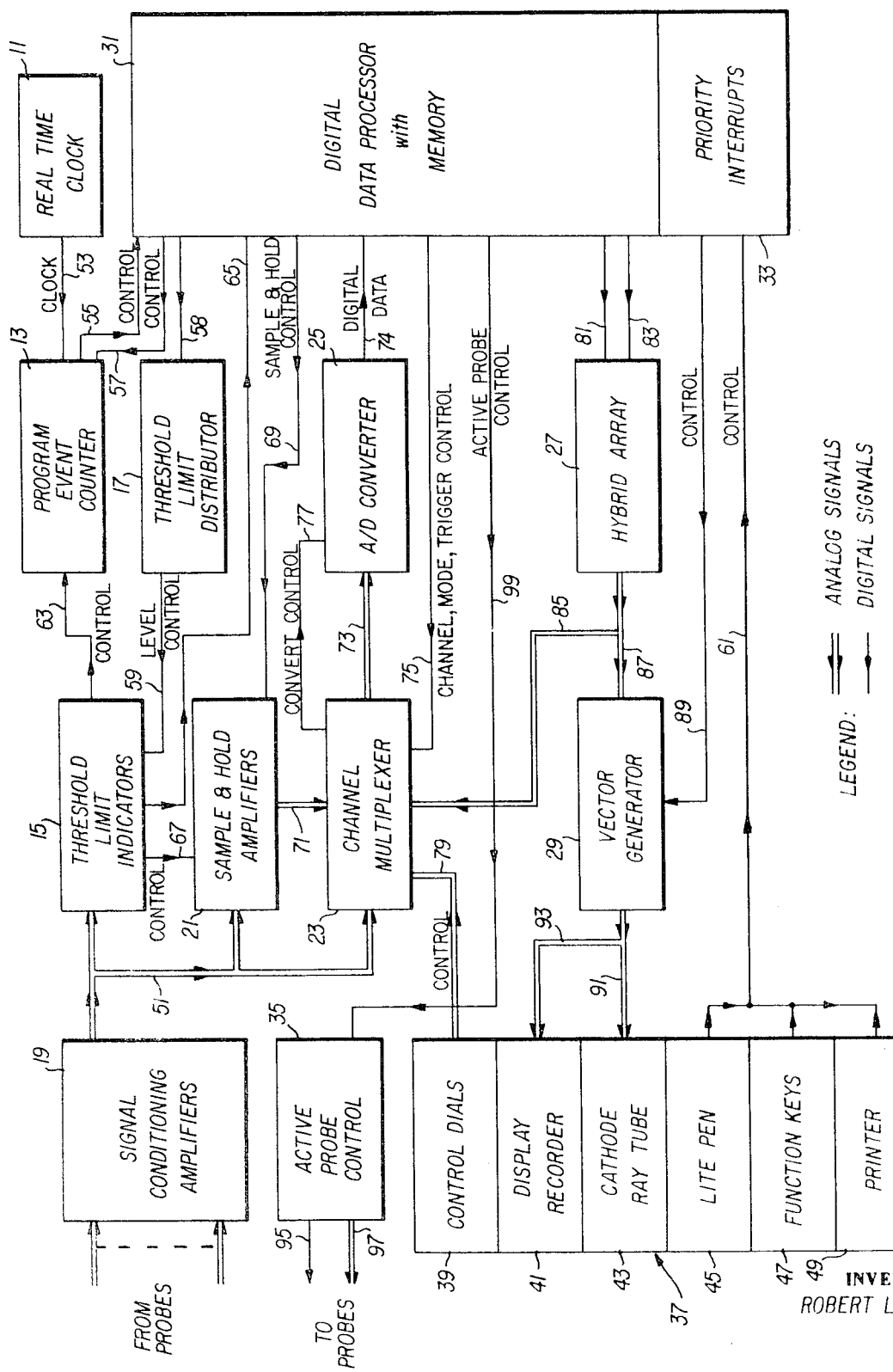
FIG. 1 is a block diagram of a preferred embodiment of the biomedical sensing and display apparatus of the invention.

FIG. 1 illustrates a preferred embodiment of a biomedical sensing and display apparatus formed in accordance with the invention and comprises: a real-time clock 11; a program event counter 13; threshold limit indicators 15; a threshold limit distributor 17; signal conditioning amplifiers 19; sample and hold amplifiers 21; a channel multiplexer 23; an analog-to-digital converter 25; a hybrid array 27; a vector generator 29; a digital data processor 31, including priority interrupts 33; an active probe control 35; and, a console 37. The console comprises: control dials 39; a display recorder 31; a cathode-ray tube 43; a lite pen 45; function keys 47; and, a printer 49.

For ease of illustration analog signal paths are illustrated by the double lines in FIG. 1 and digital signal paths are illustrated by the single lines. In addition, while single interconnecting lines are illustrated between the various subsystems, it is to be understood that a plurality of connecting lines would be used in an actual embodiment of the invention to apply the required signals from one point to other points.

The analog signals from the biomedical probes, which may be electroencephalograph (EEG), electrocardiograph (EKG), or any other suitable biomedical probes, are applied to the inputs of the signal conditioning amplifiers 19. That is, the analog output from each probe is separately connected to the input of one amplifier of the plurality of amplifiers forming the signal conditioning amplifiers 19. The signal conditioning amplifiers amplify the input signals to voltage and/or current levels suitable for application to the other subsystems of the invention. The amplified analog outputs from the signal conditioning amplifiers 19 are applied via a suitable connecting wire(s) 51 to the inputs of the threshold limit indicators 15, the sample and hold amplifiers 21, and the channel multiplexer 23.

The real-time clock 11 generates clock pulses at any desired frequency, such as 100 kHz., for example. The clock pulses are applied via a suitable connector 53 to an input of the program event counter. The program event counter counts the pulses generated by the real-time clock 11 and applies control signals at suitable time intervals, via a control wire(s) 55, to the digital data processor 31. In addition, the digital data processor may apply count control signals, via a control wire(s) 57 to the program event counter. That is, the digital data processor in accordance with the signals determined by the setting of the function keys 47, applies control signals to the program event counter 13 which signals determine the number of clock pulses that must be counted before a predetermined control signal is applied via the control wire(s) 55 to the digital data processor 31. When a control signal is applied to the digital data processor 31 by the program event counter, the digital data processor generates various control types of signals and applies them in the manner hereinafter described.

The digital data processor 31 is connected via a suitable control wire(s) 58 to the threshold limit distributor 17. And, the threshold limit distributor 17 is connected via a level control wire(s) 59 to the threshold limit indicators 15. The threshold limit distributor determines which probes are to be connected to the threshold limit indicators and sets the threshold limits for those channels. Probe determination and threshold limits are determined and set in accordance with control signals from the digital data processor which signals are determined by the action of the function keys 47. That is, the function keys 47 control the overall operation of the system in the manner herein described. More specifically, when the function keys are depressed, the digital data processor 31 receives signals via a wire(s) 61 at its priority interrupt section 33. The digital data processor interprets the function key signals and applies control signals to the various subsystems of the invention. Included in the control signals are threshold signals which are applied via control wire(s) 58 to the threshold limit distributor 17.

When the threshold limit indicators detect that a particular probe signal has surpassed a particular threshold, a control signal is applied by the threshold limit indicators via a control wire(s) 63 to the program event counter 13 and via a sense wire(s) 65 to the digital data processor 31. The control signal from the threshold limit indicators on wire(s) 63 disables the program event counter 13 from counting further pulses and, the sense signal on wire(s) 65 causes a priority interrupt which interrupts the normal operation of the digital data processor. In addition to the foregoing operations, the threshold limit indicator also applies a control signal when necessary via a control wire(s) 67 to the sample and hold amplifiers 21 which disables the operation of the sample and hold amplifiers.

The sample and hold amplifiers 21 are formed of any several well-known amplifier circuits which sample signals and maintain or hold a record of the sampled signals for a predetermined time. The rate of sampling and time of holding being determined by a control signal applied to the sample and hold amplifiers by the digital data processor via a sample and hold control wire(s) 69. When and if desired, the sample and hold amplifiers apply their sampled and hold analog signals to the channel multiplexer via a signal wire(s) 71.

The output from the channel multiplexer 23 is applied via a signal wire(s) 73 to the input of the analog-to-digital converter 25. The digital output of the analog-to-digital converter 25 is applied to the digital data processor 31 via a digital data wire(s) 74. In the digital data processor, the digital data signal is applied to the memory in any of many well-known manners. To control the operation of the channel multiplexer, the digital data processor applies a channel, mode and trigger control signal to the channel multiplexer 23 via a channel, mode and trigger control wire(s) 75. This control signal determines the channel mode of operation of the multiplexer (i.e., rate and sequence of switching from one channel to the next channel) and when each channel's analog-to-digital conversion is to be started (triggered). In accordance with the trigger signal, the channel multiplexer applies a convert control signal to the analog-to-digital converter 25 via a convert control wire(s) 77. In general, this signal starts and maintains the analog-to-digital conversion for a particular probe signal.

Which channel or channels (the number of channels being determined by the number of analog inputs applied to the channel multiplexer from its various sources) of the channel multiplexer 23 are to have their signals converted in sequence by the analog-to-digital converter is determined by the adjustment of control dials 37. That is, the control dials determine which channels are to be read and converted by applying suitable control signals via a control wire(s) 79 to the channel multiplexer 23.

The hybrid array 27 is connected to the digital data processor 31 via a means of connection illustrated as two wires 81 and 83. One wire(s) 81 carries the digital signal applied by the analog-to-digital converter to the digital data processor 31 either by reading from memory or directly from the analog-to-digital converter. This digital signal includes horizontal, vertical and intensity information about the original analog signal. The other wire(s) 83 carries a digital signal that includes horizontal, vertical and intensity modifying information. The hybrid array in a well-known manner receives these digital signals and generates an analog output signal in accordance therewith. Hence, the hybrid array acts as a digital-to-analog converter that reconstructs or reconstitutes the original analog signal. In addition, the hybrid array can modify the original analog signal. The output from the hybrid array is, hence, an analog signal that includes horizontal, vertical and intensity information, modified or unmodified, as desired.

The output from the hybrid array is applied via signal wire(s) 85 to the channel multiplexer 23 and via a signal wire(s) 87 to the vector generator 29. The vector generator also receives a control signal, via a control wire(s) 89, from the priority interrupt portion 33 of the digital data processor 31. The vector generator converts the hybrid output signals into horizontal, vertical and intensity information signals suitable for application to a cathode-ray tube or a display recorder. Consequently, these signals are applied to the cathode-ray tube 43 via a signal wire(s) 91 and to the display recorder 41 via a signal wire(s) 93.

The active probe control 35 is adapted to apply electrical signals to any of the biomedical probes connected to the patient. A switching control signal is connected via a control wire(s) 95 to a switching means (not shown) to control the application of an analog signal applied via an analog signal wire(s) 97 to one or more of the plurality of probes. In addition, the switching control signal causes a disconnection of the signal applying probes from input of the signal conditioning amplifiers 19. The operation of the active probe control 35 is controlled by a control signal from the digital data processor 31 applied to it via a wire(s) 99. The function keys 47 determine the nature of the control signal, that is, the function keys control the digital data processor 31 so that it applies a suitable control signal along the control wire(s) 99 to the active probe control 35. In accordance with this signal, the active probe control applies a switching control signal to wire(s) 95 and an electrical active signal to wire(s) 97. In this manner, one or more of the probes applies an active electrical signal to one or more points on the patient. This signal evokes a response from the patient which is sensed by the remaining probes.

The foregoing description has described the basic connections of the invention and the functions of the various subsystems contained therein. So that the invention is more clearly understood, the following description of the overall operation of the invention is presented.

Because of the aperiodic character of the individual signals being monitored by the invention, the analog signal sampling rate must be considerably higher than that formulated by the Nyquist sampling theorem; particularly, if a detailed study and comparison of portions of the aperiodic signals represents a major consideration. This invention is flexible in order to monitor on command, any number of channels at an individual sampling rate up to a maximum figure, such as 100 kHz., for example, wherein, the number of channels times the sampling rate equals the maximum figure. Thus, one channel could be sampled at 100 kHz. or 50 channels could be sampled at 2 kHz. In between, the sampling rate varies in accordance with the number of channels being sampled. In this manner, the very rapid sampling of a particular channel or limited number of channels can be provided, if desired.

It is assumed in the following description that the system has just been placed in operation and that no equivalent analog signal in digital form has been stored in the memory. The signal flow path for one analog signal of a plurality of signals being simultaneously monitored is described. For purposes of description, it is assumed that the total number of analog signals being monitored is 20 so that the sampling rate is 5 kHz.

Upon initiation of operation, the analog signals appearing at the output of the signal conditioning amplifiers 19 are simultaneously impressed upon the inputs of the threshold limit indicators 15, the sample and hold amplifiers 21, and the channel multiplexer 23. Previously, the analog-to-digital converter 25, and the memory portion of the digital data processor have been enabled. More specifically, the function keys (which may be operated by a digital program if desired) provide a control signal along control wire(s) 61 to the digital data processor which in turn generates control signals that enable the subsystems. The cathode-ray tube 43 and the display recorder 41 on the console 37 are enabled by suitable enabling switches.

The individual analog waveforms appearing at the input of the channel multiplexer 23 are each sampled every 200 microseconds (5 kHz. rate). Each sample or waveform section is converted by the analog-to-digital converter 25 into a digital signal corresponding to the amplitude of these sampled sections. This digital information is available to the memory of the digital data processor 31. In addition, it is applied to the hybrid array 27 via wire(s) 81. The hybrid array reconstitutes this information in analog form and applies it to the vector generator 29. The vector generator applies the reconstituted analog signal to the cathode-ray tube 43 and the display recorder 41 where it is displayed.

The operator of the invention, after ascertaining that the waveforms are displayed with clarity and sufficient detail, and represent information that is required and relevant (in terms of biomedical information) operates a suitable function key which causes the channel multiplexer to sense the output from the hybrid array 27 and apply it via the analog-to-digital converter to the digital data processor wherein it is stored in the memory. In this manner, the analog signals received at all of the probes are viewed by the operator of the system and stored in the memory portion of the digital data processor.

For the purposes of the following description, it is assumed that either: (a) some time has passed, and it is desired to assess progress in the clinical condition of the patient; or, (b) that some action has taken place which is believed to have an effect on the clinical condition of the patient. The action causing the effect may come from various sources, such as the introduction of medication, exercise, an evoked potential instituting means (i.e., light, heat, blinking of eyes, moving members of the body, etc.), or active signals (i.e., introduction of an active electric signal to some of the probes, introduction of a pacemaker, etc.), for example.

Regardless of the cause, it is now desired to remonitor the probe signals and observe the differences, if any, that have occurred in their waveforms. In some cases, it may be desirable to monitor the signals at some fixed time after the introduction of the action causing the waveforms to be modified. If so, this time delay is introduced into the system by means of the function keys and the control dials. In addition, as a result of previous experience, it is often desirable to set up threshold limits for the detection of theoretically meaningful modifications (either amplitude or phase) occurring in portions of the waveforms. These threshold limits are set up by an appropriate adjustment of the function keys in the manner heretofore described. That is, as previously described, the function keys through the digital data processor control the threshold limit distributor. And, the threshold limit distributor controls the setting of threshold limits in the threshold limit indicators 15.

After the system has been set up as described in the preceding paragraphs, it operates automatically to resample the analog signals from all probes of interest and display the new waveforms on the cathode-ray tube 43. If the interest in the signal is such that it is concentrated on transient phenomena which are expected to occur at some fixed period of time after an action creating signal has been impressed, the control dials 39 control the channel multiplexer to read the analog signal information after the period of time has passed. If desired, this signal can be reconstituted in the manner previously described and applied to the cathode-ray tube 43. Alternatively, it can be directly applied to the memory.

If it is desired to perform a comparison between a stored signal from a particular probe and a new signal, the digital data processor reads out both signals from its memory and compares them in any of several well-known manners. The results of the comparison are reconstituted and displayed on the cathode-ray tube. If it is assumed that the "new" analog signal differs from the "old" or stored analog signal, the signal displayed on the cathode-ray tube is a faithful replica of the new analog signal with differences in the waveform characteristics intensified. That is, as previously described, the hybrid array and the vector generator operate so that the displayed signal is intensity modulated where differences in the waveform characteristics occur.

If desired, both of the new analog signals can be stored in memory without losing the previously stored signals by suitably operating the function keys. Thus, later comparison and study of the waveforms can be performed by a competent individual. The limiting factor being, of course, the size of the memory provided by the overall system. In addition, if desired, at any time the operator of the invention can read out a signal from memory and have it reconstituted and displayed on the cathode-ray tube or the display recorder. Moreover, if desired, displayed signals can be printed out as hard copies by the printer 49. Finally, the cathode ray tube could be a plurality of cathode-ray tubes so that a plurality of probe signals can be simultaneously displayed. Alternatively, the cathode-ray tube could be a plural beam cathode-ray tube.

It will be appreciated from the foregoing description that the invention provides a novel biomedical apparatus for sensing and displaying biomedical signals. In addition, the system provides means for comparing a previously stored biomedical signal with a later received biomedical signal. The results of the comparison are intensity modulated at points in the waveform where a difference between the two signals occurs so that differences can be easily observed. In addition to providing a system for displaying and comparing bio-medical signals, the invention also includes a novel system for mounting a plurality of probes suitable for obtaining electroencephalograph waveforms. This apparatus is illustrated in FIGS. 2 and 3 and hereinafter described.

Figure 3:
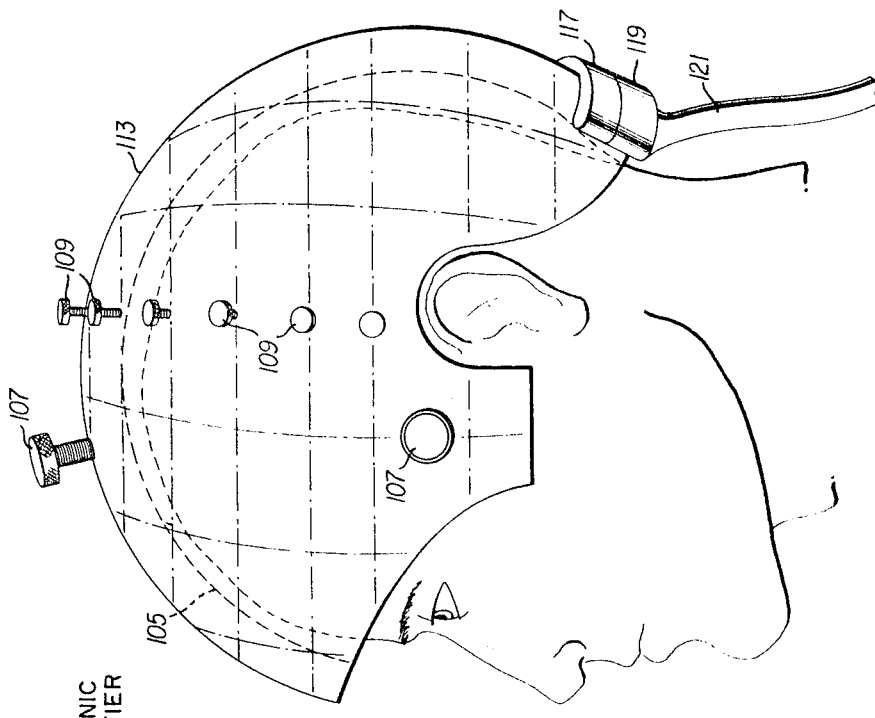
Figure 2:
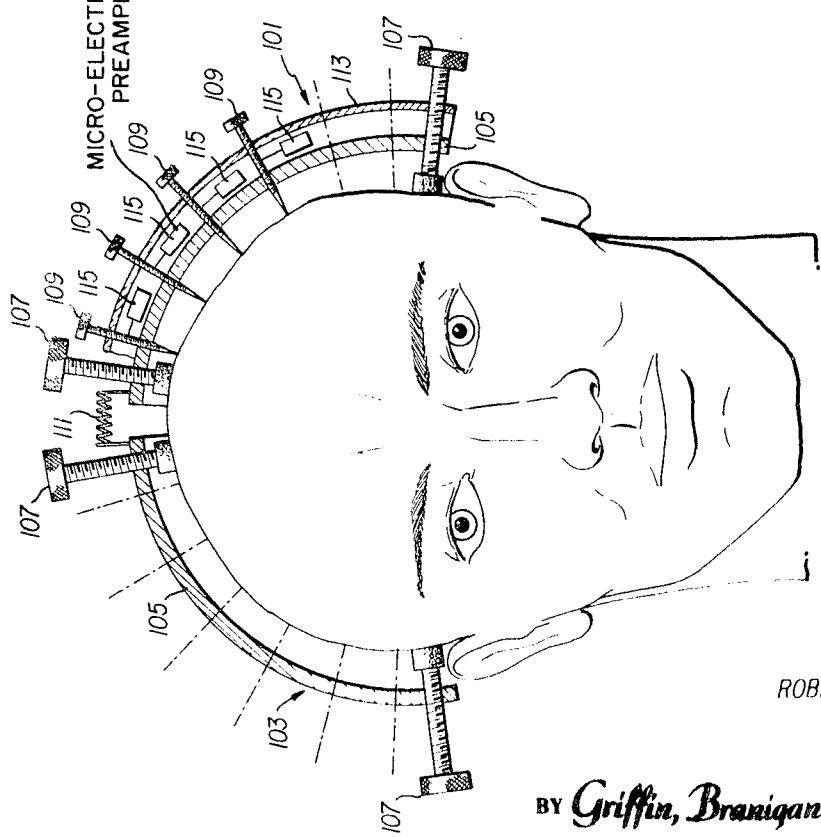
FIG. 2 is a pictorial diagram of an EEG probe housing formed in accordance with the invention; and, FIG. 3 is a side view of the EEG probe housing illustrated in FIG. 2.

The EEG probe housing apparatus illustrated in FIGS. 2 and 3 is the shape of a semihemisphere or helmet formed of two half-hemispherical sections 101 and 103. The half-hemispherical sections 101 and 103 are mirror images of one another and are adapted to fit over the upper portion of the patient's head, one being located on one side of the head and the other being located on the other side of the head.

Each half-hemispherical section comprises an inner support member 105. A plurality of adjustable cushion spacers 107 pass through each inner support member 105. For purposes of clarity, only two of the adjustable cushion spacers 107 are illustrated in FIGS. 2 and 3, however, as many as necessary may be included. The adjustable cushion spacers 107 may be threaded into the inner support members 105 or held in any other suitable manner that allows inward and outward movement. Also passing through the inner support members 105 are a plurality of probes 109. The probes are also adapted to move inwardly and outwardly by any suitable means, such as being threaded through the inner support member 105. A plurality of mechanical springs 111 are connected between the two inner support members 105 so as to cause an inwardly acting force at the lower ends of the support members. That is, the springs are connected across a front-rear gap between the sections so as to force the two sections toward one another. Hence, when a patient's head is placed inside of the housing, the housing is firmly affixed to the head.

Located outside of the inner support member 105 of section 101 and 103 and formed similar thereto is a protective overlay 113 incorporating a faraday shield. The adjustable cushion spacers 107 and the probes 109 pass through the faraday shield so that they can be easily moved inwardly and outwardly as desired. Located between the faraday shields 113 and the inner support members 105 are a plurality of microelectronic preamplifiers 115. The inputs of the microelectronic preamplifiers are normally connected to the probes. The outputs of the microelectronic preamplifiers are connected to a male connector 117 located at the back of each of the inner support members 105 as illustrated in FIG. 3. A female connector 119 connected to a cable 121 is adapted to be attached to the male connector 117. The female connector is connected to the inputs of the signal conditioning amplifiers 19 and the outputs of the active probe control 35 illustrated in FIG. 1.

It will be appreciated from the foregoing description that the housing illustrated in FIGS. 2 and 3 and forming a portion of the invention is relatively uncomplicated. In addition, it allows the probes to be arrayed in a predetermined array format as illustrated by the dashed lines in FIG. 3. Moreover, a considerably larger number of probes can be applied to the head of a patient than can be applied by prior art probe housing apparatus. Further, because microelectric preamplifiers are located near the probes lower level signals than could be detected by prior art devices can be detected. Finally, because a faraday shield is provided, extraneous signals are prevented from having an undesirable effect on the signals sensed by the probes, thereby improving the signal-to-noise ratio of each input signal.

The embodiments of the invention in which an exclusive property or privileges are claimed are defined as follows:

1. A biomedical sensing and display apparatus comprising:
a plurality of biomedical probes, suitable for attachment to a living body, for detecting signals generated by the living body and applying signals to the living body;
a channel multiplexer connected to receive biomedical signals from said plurality of biomedical probes and for applying the biomedical signals sequentially to an output terminal;
an analog-to-digital converter connected to the output terminal of said channel multiplexer for converting the biomedical signals at the output terminal of said channel multiplexer from analog form to digital form;
a digital data processor including a memory connected to the output of said analog-to-digital converter for storing said digital signals in said memory;
reconstitution means connected to said digital data processor for reconstituting signals stored in the memory of said digital data processor for digital form to analog form;
display means connected to said reconstitution means for displaying said reconstituted analog signals;
said digital data processor also including means for reading out signals stored in said memory and for comparing said signals, the results of said comparison being applied to said reconstitution means to modify the display signal also applied to said reconstitution means;
control means connected to said digital data processor for controlling the operation of said digital data processor, said digital data processor also being connected to said channel multiplexer and to said reconstitution means for controlling the operation of said channel multiplexer and said reconstitution means;
threshold limit indicators connected to receive said biomedical signals from said plurality of biomedical probes; and,
a threshold limit distributor connected to said digital data processor and to said threshold limit indicators for receiving control signals from said digital data processor and for applying threshold level control signals to said threshold limit indicators.

2. A biomedical sensing and display apparatus as claimed in claim 1 including sample and hold amplifiers connected to receive said biomedical signals from a plurality of probes, the output of said sample and hold amplifiers is connected to said channel multiplexer, said sample and hold amplifiers also connected so as to receive sample and hold control signals from said digital data processor.

3. A biomedical sensing and display apparatus as claimed in claim 2 including a real-time clock for generating clock pulses at a predetermined frequency and a program event counter connected to said real-time clock to count said clock pulses, said program event counter connected to said digital data processor to apply control signals to said digital data processor and to receive control signals from said digital data processor.

4. A biomedical sensing and display apparatus as claimed in claim 3 including an active probe control connected to apply active electrical signals to said plurality of probes.

5. A biomedical sensing and display apparatus as claimed in claim 3 including signal conditioning amplifiers connected to receive said biomedical signals from said plurality of probes and to apply said signals to said threshold limit indicators, said sample and hold amplifiers and said channel multiplexer.

6. A biomedical sensing and display apparatus as claimed in claim 5 including control dials connected to said channel multiplexer to determine which probe signals of said plurality of probe signals are to be applied to said analog-to-digital converter; and wherein said control means includes function keys connected to said digital data processor to control the operation of said digital data processor.

7. A biomedical sensing and display apparatus as claimed in claim 6 wherein said reconstitution means includes a hybrid array connected to said digital data processor and a vector generator, said vector generator connected to the output of said hybrid array and to the input of said display means.

8. A biomedical sensing and display apparatus as claimed in claim 7 wherein said display means includes a cathode-ray tube.

9. A biomedical sensing and display apparatus as claimed in claim 8 wherein said threshold limit indicators are connected to apply a control signal to said program event counter and said sample and hold amplifiers when a predetermined threshold has been surpassed and, to said digital data processor to apply a sense signal to said digital data processor when said predetermined threshold has been surpassed.

10. A biomedical sensing and display apparatus as claimed in claim 9 wherein said digital processor includes means for reading out signals stored in its memory and for comparing said signals, the results of said comparison being applied to said hybrid array to modify the display signal also applied to said hybrid array.

11. A biomedical sensing and display apparatus as claimed in claim 10 wherein each of said plurality of biomedical probes is an electroencephalographic probe; and, further including an electroencephalographic probe housing suitable for supporting electroencephalographic probes adjacent to the head of a patient, said electroencephalographic probe housing being formed of two sections attached to one another, each of sections comprising:

an inner support member that is half-hemispherical in shape, said inner support member including a plurality of apertures formed between the surfaces thereof and arranged in a predetermined array, said plurality of electroencephalographic probes being mounted in said apertures in an inwardly and outwardly movable manner;

spacing means attached to said inner support member for maintaining said inner support member a predetermined distance from the head of said patient; and, electrical shielding means formed similar to said inner support member and mounted about the outer surface of said inner support member in spaced relationship thereto so as to electrically shield said plurality of electroencephalographic probes from external electrical signals.

12. A biomedical sensing and display apparatus as claimed in claim 11 wherein said inner support members of said two sections are attached together by springs that tend to force one of said inner support members toward the other of said inner support members.

13. A biomedical sensing apparatus as claimed in claim 12 wherein said spacing means includes adjustable cushioned spacers moveably mounted through apertures in said inner support members.

14. A biomedical sensing and display apparatus as claimed in claim 13 including:

a plurality of microelectronic preamplifiers mounted between said inner support members and said electrical shielding means, the inputs of one of said plurality of microelectronic preamplifiers being connected to each of said electroencephalographic probes; and, a connector attached to said sections and electrically connected to the outputs of said microelectronic preamplifiers and to the inputs of said signal conditioning amplifiers.

15. An electroencephalographic probe housing suitable for supporting electroencephalographic probes adjacent to the head of a patient, said electroencephalographic probe housing comprising:

two sections, each of said sections comprising:

an inner support member that is half-hemispherical in shape and includes a plurality of apertures formed between the surfaces thereof and arranged in a predetermined array;

a plurality of electroencephalographic probes, one of said probes being mounted in each of said plurality of apertures in said inner support member, said plurality of electroencephalographic probes being mounted so as to be movable inwardly and outwardly;

spacing means attached to said inner support member for maintaining said inner support member a predetermined distance from the head of said patient, said spacing means comprising a plurality of threaded shafts having cushions on their inner ends, said threaded shafts passing through threaded apertures in said inner support member; and, electrical shielding means formed similar to said inner support member and mounted outside of said inner support member in spaced relationship thereto so as to electrically shield said plurality of electroencephalographic probes from external electrical signals; and, springs attached to said inner support members for biasing one section of said two sections towards the other section of said two sections.

16. An electroencephalographic probe housing as claimed in claim 15 including:

a plurality of microelectronic preamplifiers mounted between said inner support members and said electrical shielding means, the inputs of one of said plurality of microelectronic amplifiers being connected to each of said electroencephalographic probes; and, a connector attached to said sections and electrically connected to the outputs of said plurality of microelectronic preamplifiers.

* * * * *